US009240926B2

(12) United States Patent
Ofuji et al.

(10) Patent No.: US 9,240,926 B2
(45) Date of Patent: Jan. 19, 2016

(54) BASE STATION AND COMMUNICATION CONTROL METHOD

(75) Inventors: Yoshiaki Ofuji, Tokyo (JP); Naoto Ookubo, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 133 days.

(21) Appl. No.: 14/343,520

(22) PCT Filed: Aug. 3, 2012

(86) PCT No.: PCT/JP2012/069849
§ 371 (c)(1),
(2), (4) Date: Mar. 7, 2014

(87) PCT Pub. No.: WO2013/035469
PCT Pub. Date: Mar. 14, 2013

(65) Prior Publication Data
US 2014/0219180 A1    Aug. 7, 2014

(30) Foreign Application Priority Data
Sep. 9, 2011    (JP) ................................. 2011-197603

(51) Int. Cl.
*H04L 12/24*    (2006.01)
*H04W 48/12*    (2009.01)
*H04W 72/04*    (2009.01)

(52) U.S. Cl.
CPC ........... *H04L 41/0853* (2013.01); *H04W 48/12* (2013.01); *H04W 72/0446* (2013.01)

(58) Field of Classification Search
CPC ............. H04L 41/0853; H04W 48/12; H04W 72/0446
See application file for complete search history.

(56) References Cited

U.S. PATENT DOCUMENTS

| 8,996,049 B2 * | 3/2015 | Nishio et al. ................... 455/507 |
| 2009/0239484 A1 | 9/2009 | Miyoshi et al. |
| 2010/0034139 A1 * | 2/2010 | Love et al. ..................... 370/328 |
| 2010/0067496 A1 * | 3/2010 | Choi .............................. 370/336 |
| 2010/0110947 A1 | 5/2010 | Kitazoe |
| 2010/0260136 A1 * | 10/2010 | Fan et al. ...................... 370/330 |

(Continued)

FOREIGN PATENT DOCUMENTS

| EP | 2 383 918 A1 | 11/2011 |
| WO | 2006/095872 A1 | 9/2006 |
| WO | 2009129144 A2 | 10/2009 |

(Continued)

OTHER PUBLICATIONS

International Search Report issued in PCT/JP2012/069849 mailed on Aug. 28, 2012 (4 pages).

(Continued)

*Primary Examiner* — Brian D Nguyen
(74) *Attorney, Agent, or Firm* — Osha Liang LLP

(57) ABSTRACT

A base station 100 maps the system information formed of multiple blocks (SIB) to predetermined regions of a downlink shared channel and transmits the mapped system information to the mobile station. The base station 100 includes: a system information transmission control unit 105 configured to divide each of the predetermined regions into a first half and a second half in a time direction; and a transmission data generation unit 111 configured to map the system information to at least one of the first half and the second half. The system information transmission control unit 105 switches positions of the first half and the second half in rotation every transmission timing of the predetermined regions on the shared channel.

4 Claims, 8 Drawing Sheets

(56) References Cited

U.S. PATENT DOCUMENTS

2011/0090895 A1*  4/2011  Du .................................. 370/345
2011/0275396 A1* 11/2011  Nishio et al. .................. 455/509
2013/0023267 A1*  1/2013  Ong et al. .................. 455/435.1

FOREIGN PATENT DOCUMENTS

WO     2010/062773 A2   6/2010
WO     2010/087176 A1   8/2010

OTHER PUBLICATIONS

3GPP TS 36.300 V10.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Mar. 2011 (197 pages).

Search Report issued in corresponding European Application No. 12829417.0, mailed Jun. 9, 2015 (9 pages).

3GPP TS 36.331 V10.2.0; "3rd Generation Partnership Project; Technical Specification Group Radio Access Network; Evolved Universal Terrestrial Radio Access (E-UTRA); Radio Resource Control (RRC); Protocol specification (Release 10)"; Jun. 2011 (294 pages).

Panasonic; "Continuous collision between Paging/SI and Measurement gap"; 3GPP TSG RAN2 Meeting #77bis, R2-121826; Jeju, Korea; Mar. 26-30, 2012 (4 pages).

* cited by examiner

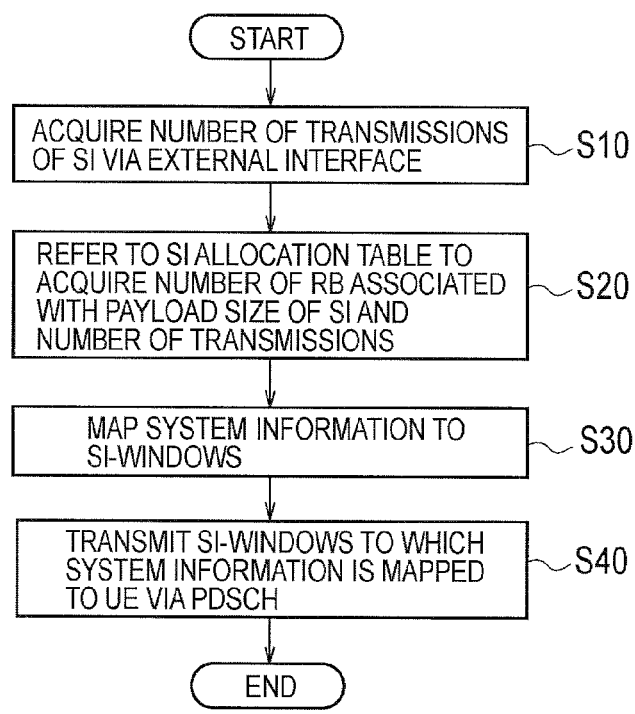
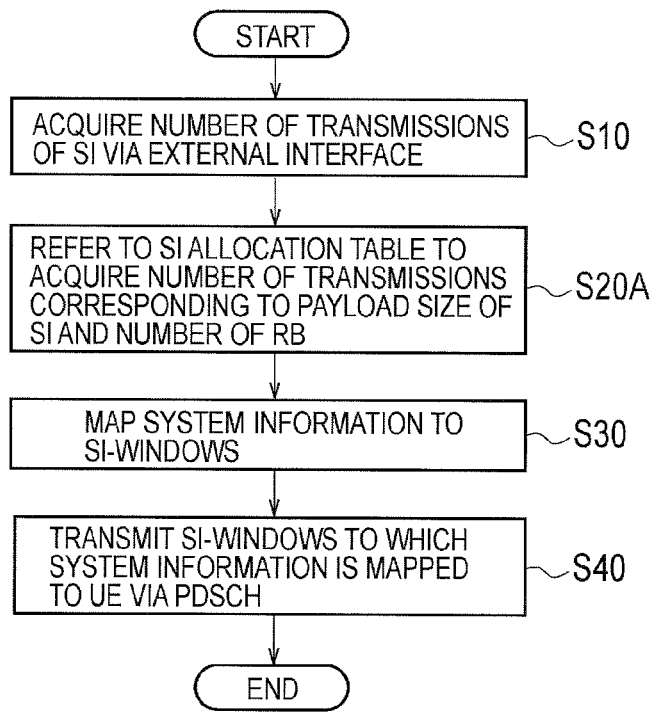

FIG. 5

| | SIR=XdB, | SIR=YdB, | | |
|---|---|---|---|---|
| PAYLOAD SIZE | ~56BITS | 56BITS ~120BITS | 120BITS ~176BITS | 176BITS ~224BITS |
| NUMBER OF TRANSMISSIONS = 1 | 12 | 20 | 26 | 28 |
| NUMBER OF TRANSMISSIONS = 2 | 6 | 10 | 14 | 16 |
| NUMBER OF TRANSMISSIONS = 3 | 4 | 6 | 9 | 12 |
| NUMBER OF TRANSMISSIONS = 4 | 3 | 5 | 6 | 8 |
| | | | | |
| NUMBER OF TRANSMISSIONS = N | | | | |

FIG. 6

| | SIR=xdB, | SIR=ydB, | | |
|---|---|---|---|---|
| PAYLOAD SIZE | ~56BITS | 56BITS ~120BITS | 120BITS ~176BITS | 176BITS ~224BITS |
| NUMBER OF TRANSMISSIONS, NUMBER OF RB | 1, 12 | 1, 20 | 2, 14 | 2, 16 |

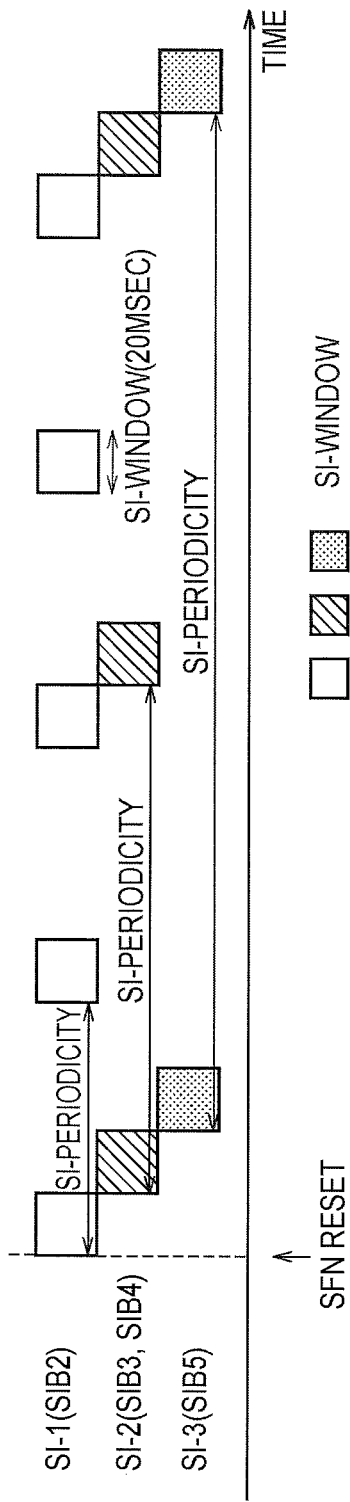

BASE STATION AND COMMUNICATION CONTROL METHOD

TECHNICAL FIELD

The present invention relates to a base station and a communication control method which map system information formed of multiple blocks to a predetermined region of a downlink shared channel and transmit the mapped system information to a mobile station.

BACKGROUND ART

The Long Term Evolution (LTE) standardized in the 3rd Generation Partnership Project (3GPP) uses system information formed of multiple SIB (System Information Blocks).

Among the multiple SIB, a SIB1 is defined such that the SIB1 is transmitted by using Subframes #5 in Radio frames with even-numbered System Frame Numbers (SFN). A transmission periodicity of the SIB1 is 80 msec; specifically, the SIB1 is transmitted at 20 msec intervals four times (one first transmission and three retransmissions). Meanwhile, SIB (SIB2 and following SIB) other than the SIB1 are mapped to SI-windows of a downlink shared channel and transmitted in units of SI.

FIG. 11 shows mapping and a transmission image of the SIB other than the SIB1. As shown in FIG. 11, the size of the SI-window is common to the pieces of SI (SI-1 to SI-3) (notified in the SIB1). The SI-windows are defined such that each SI-window does not overlap any other SI-window in a time axis direction. Moreover, regarding each piece of the system information (SI), the SI (for example, SI-1) is transmitted in the SI-window of 20 msec set in each predetermined periodicity (SI-periodicity).

PRIOR ART DOCUMENT

Non-Patent Document

Non-patent document 1: 3GPP TS 36.300 V10.3.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), March 2011

SUMMARY OF THE INVENTION

Meanwhile, in order for the mobile station to measure reception states of a cell operating at a different frequency and a cell of a different system, a time when the mobile station cannot receive the system information described above exists in predetermined cycles (Measurement Gap). Accordingly, when the SI-window described above and the Measurement Gap overlap each other in the time direction, there may be a case where the mobile station cannot receive the system information.

The present invention has been made in view of the situation described above and an object thereof is to provide a base station and a communication control method in which the base station can more surely receive the system information even when the mobile station is set to have Measurement Gap for measuring a reception state of an adjacent cell is set.

A first feature of the present invention is summarized as a base station (base station 100) configured to map system information formed of multiple blocks (SIB) to predetermined regions of a downlink shared channel and transmit the mapped system information to a mobile station (mobile stations 200A and 200B), including: a system information transmission control unit (system information transmission control unit 105) configured to divide each of the predetermined regions into a first half and a second half in a time direction; and a transmission data generation unit (transmission data generation unit 111) configured to map the system information to at least one of the first half and the second half, wherein the system information transmission control unit switches positions of the first half and the second half in rotation every transmission timing of the predetermined regions on the shared channel.

A second feature of the present invention is summarized as a radio communication method of mapping system information formed of a plurality of blocks to predetermined regions of a downlink shared channel and transmitting the mapped system information to a mobile station, including the steps of: dividing each of the predetermined regions into a first half and a second half in a time direction; mapping the system information to at least one of the first half and the second half; and switching positions of the first half and the second half in rotation every transmission timing of the predetermined regions on the shared channel.

BRIEF DESCRIPTION OF THE DRAWINGS

FIG. 3 is a view showing an operation flow (part 1) in which the base station 100 determines the number of SI transmissions and the number of radio resource blocks in the embodiment of the present invention.

FIG. 4 is a view showing an operation flow (part 2) in which the base station 100 determines the number of SI transmissions and the number of radio resource blocks in the embodiment of the present invention.

FIG. 5 is a view showing an example of an SI allocation table in the embodiment of the present invention.

FIG. 6 is a view showing another example of the SI allocation table in the embodiment of the present invention.

FIG. 11 is a view showing mapping and a transmission image of SIB (System Information Blocks) other than a SIB1.

MODE FOR CARRYING OUT THE INVENTION

Figure 1:
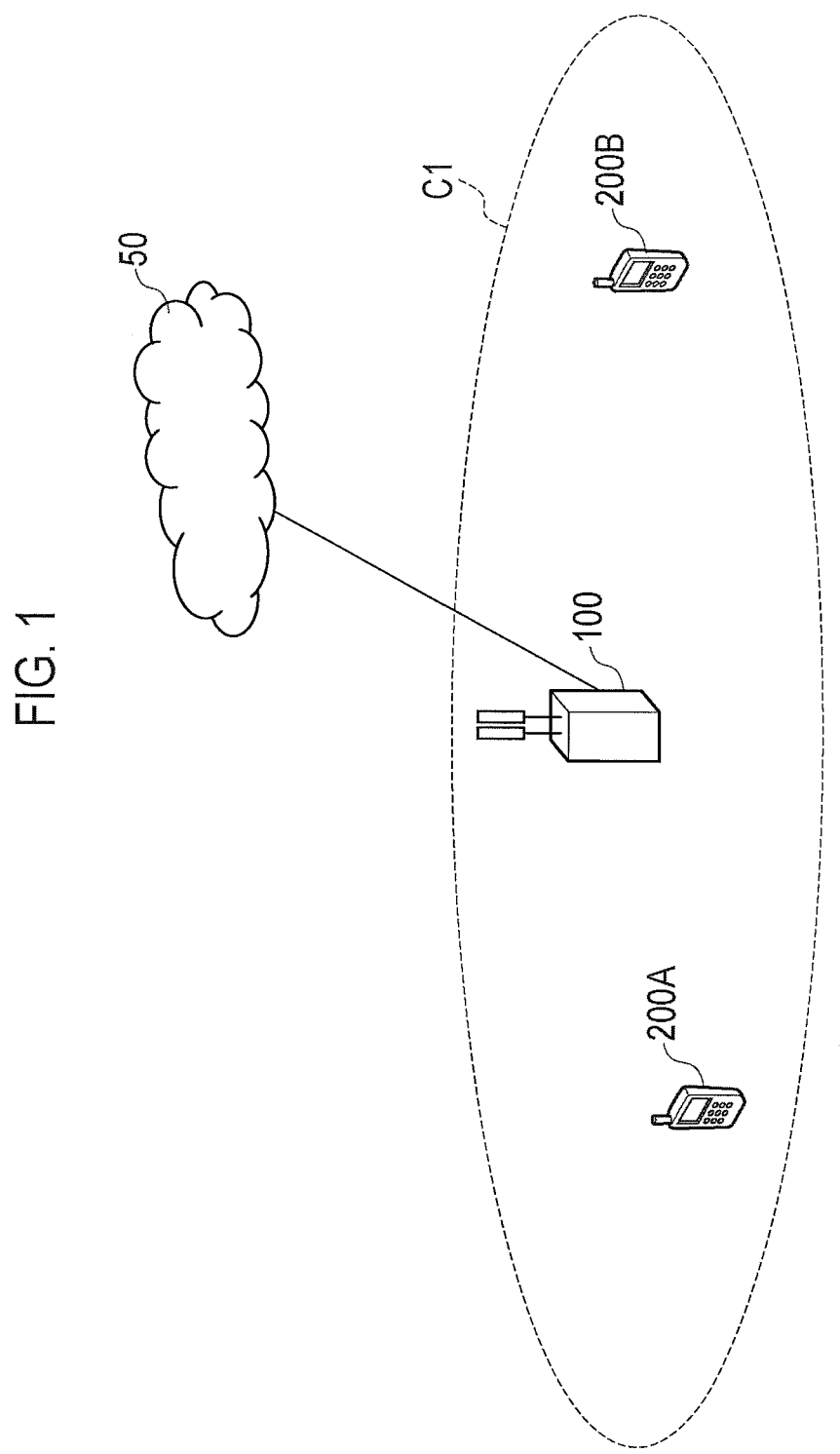
FIG. 1 is an overall schematic configuration diagram of a radio communication system in an embodiment of the present invention.

Hereinafter, embodiments of the present invention will be described. Note that, in the following description of the drawings, same or similar reference numerals denote same or similar elements and portions. In addition, it should be noted that the drawings are schematic and ratios of dimensions and the like in the drawings are different from actual ones.

Therefore, specific dimensions and the like should be determined in consideration of the following description. Moreover, as a matter of course, the drawings include portions having different dimensional relationships and ratios from each other.

FIG. 1 is an overall schematic configuration diagram of a radio communication system in the embodiment. As shown in FIG. 1, the radio communication system in the embodiment employs the Long Term Evolution (LTE) scheme and includes a core network 50, a base station 100 (eNB), and mobile stations 200A, 200B (UE).

The base station 100 is connected to the core network 50. The base station 100 forms a cell C1 and executes radio communication with the mobile stations 200A, 200B according to the LTE scheme. Particularly, in the embodiment, the base station 100 maps system information (system information) formed of multiple blocks (SIB) to predetermined regions (SI-window) of a downlink shared channel (PDSCH) and transmits the mapped system information to the mobile station 200A (or the mobile station 200B, the same applies hereafter).

(2) Functional Block Configuration of Radio Communication System

Figure 2:
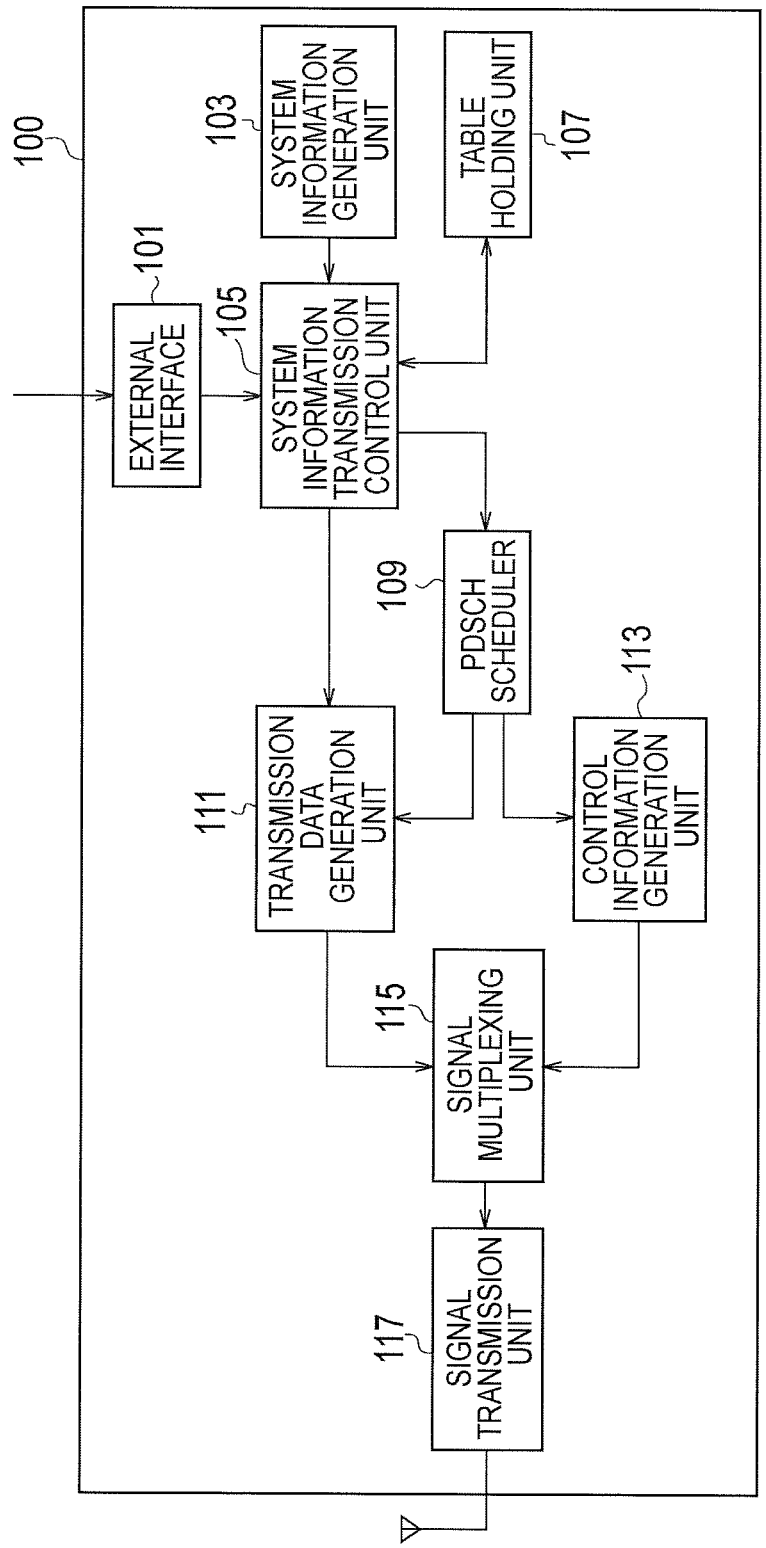
FIG. 2 is a functional block configuration diagram of a base station 100 in the embodiment of the present invention.

Next, description is given of a functional block configuration of the radio communication system in the embodiment. FIG. 2 is a functional block configuration diagram of the base station 100. As shown in FIG. 2, the base station 100 includes an external interface 101, a system information generation unit 103, a system information transmission control unit 105, a table holding unit 107, a PDSCH scheduler 109, a transmission data generation unit 111, a control information generation unit 113, a signal multiplexing unit 115, and a signal transmission unit 117.

Note that, in the embodiment, radio resource blocks (RB) are allocated to the system information at a higher priority than user data in scheduling of the downlink shared channel, specifically, the Physical Downlink Shared Channel (PDSCH).

The external interface 101 is a communication interface used to acquire various types of information from the outside of the base station 100. Specifically, the external interface 101 may be connected to another communication device (for example, an operation system (OPS)) via the core network 50 or be directly connected to another communication device.

Particularly, in the embodiment, the external interface 101 acquires the number of transmissions of the system information (hereafter referred to as SI) to the mobile station 200A. In the embodiment, the external interface 101 forms a transmission number acquiring unit.

Moreover, the external interface 101 acquires an estimated reception quality of the mobile station 200A at a cell edge of the cell C1 formed by the base station 100. In the embodiment, the external interface 101 forms a reception quality acquiring unit.

The system information generation unit 103 generates (ASN.1 coding) pieces of SI and calculates a payload size of each piece of SI. Moreover, the system information generation unit 103 notifies the system information transmission control unit 105 of all the ASN.1-encoded pieces of SI and the payload sizes of the respective pieces of SI.

The system information transmission control unit 105 controls transmission of the SI to the mobile station 200A. Specifically, the system information transmission control unit 105 determines radio resource blocks required for the transmission of SI, on the basis of tables held in the table holding unit 107.

Specifically, the system information transmission control unit 105 determines the radio resource blocks required for the transmission of SI on the basis of the tables (see FIGS. 5 and 6) associated with the reception quality (for example, SIR) of the mobile station 200A which is acquired by the external interface 101. Note that, when the number of radio resource blocks determined based on the tables exceeds the number of radio resource blocks included in the system band (for example, 5 MHz), the system information transmission control unit 105 can use the number of the radio resource blocks included in the system band.

Moreover, the system information transmission control unit 105 can divide each of the predetermined regions of PDSCH, specifically each SI-window into the first half and the second half in a time axis direction. The system information transmission control unit 105 can switch the positions of the divided first and second halves in rotation every transmission timing of the SI-windows in PDSCH.

Furthermore, the system information transmission control unit 105 can alternately set between a mode in which the SI is mapped to a predetermined-numbered transmission subframe from the head of the SI-window in the time direction and a mode in which the SI is mapped to a predetermined-numbered transmission subframe from the tail of the SI-window in the time direction, every transmission timing of SI-windows.

Alternatively, the system information transmission control unit 105 may determine the position of the transmission subframe Subframe_N to which each piece of SI is to be mapped by using (formula 1) where $N_{Tx}$ represents the number of transmissions of SI and SI-window length represents the length of each SI-window.

$$\text{Subframe\_}N = \text{SI-window length}/N_{Tx} \times (N-1) \quad \text{(formula 1)}$$

When the SI-window overlaps a predetermined transmission prohibited subframe, the system information transmission control unit 105 sequentially changes the position of the transmission subframe until the SI-window does not overlap the predetermined transmission prohibited subframe any more. Note that examples of the transmission prohibited subframe include a transmission subframe of SIB1, a MBSFN subframe, and the like. Moreover, the transmission prohibited subframe may include a transmission subframe of PCH which notifies Paging and a subframe in which Random Access Response (RAR) being a response to a RACH preamble is likely to be transmitted.

The table holding unit 107 holds the tables (SI allocation table) used for transmission control of SI. The table holding unit 107 can hold multiple tables (see FIGS. 5 and 6).

For example, in the SI allocation table shown in FIG. 5, the payload size (number of bits) of SI, the number of transmissions of SI, and the number (numerical values such as 12 and 6 in the table) of radio resource blocks corresponding to a combination of the payload size and the number of transmissions are associated with one another.

Moreover, in the SI allocation table shown in FIG. 6, the number of transmissions of SI associated with the payload size (number of bits) of SI and the number of radio resource blocks corresponding to a combination of the payload size and the number of transmissions are associated with each other. For example, when the payload size is 56 bits or less, the number of transmissions is "1" and the number of radio resource blocks (RB) is "12".

Furthermore, the table holding unit 107 may hold multiple tables each associated with a certain level of reception quality (SIR) to be satisfied by the mobile station 200A at the cell edge of the cell C1. For example, as shown in FIG. 5, the table holding unit 107 may hold a table for a SIR of xdB and a table for a SIR of ydB.

The PDSCH scheduler 109 executes scheduling of the radio resource blocks to the PDSCH. Particularly, in the embodiment, the PDSCH scheduler 109 executes scheduling of the radio resource blocks for transmission of SI according a predetermined degree of priority.

The transmission data generation unit 111 generates data to be transmitted to the mobile station 200A. Specifically, the transmission data generation unit 111 maps the SI to the SI-windows of PDSCH by using the radio resource blocks determined by the system information transmission control unit 105. Moreover, the transmission data generation unit 111 can map the SI to at least one of the first half and the second half of each SI-window which is divided by the system information transmission control unit 105.

The control information generation unit 113 executes channel coding of a PDCCH and data modulation. The signal multiplexing unit 115 multiplexes data outputted from the transmission data generation unit 111 and the control information generation unit 113 and outputs a multiplexed signal to the signal transmission unit 117.

(3) Operations of Radio Communication System

Next, description is given of operations of the radio communication system in the embodiment. Specifically, description is given of an operation in which the base station 100 determines the number of transmissions of system information (SI) and the number of radio resource blocks and an operation in which the base station 100 determines the transmission subframes of the system information (SI).

(3.1) Determination of Number of Transmissions and Number of Radio Resource Blocks First, description is given of the operation of determining the number of transmissions of SI and the number of radio resource blocks used for the transmission of SI, by referring to FIGS. 3 to 6.

(3.1.1) Operation Example 1

FIG. 3 shows an operation flow (part 1) in which the base station 100 determines the number of the SI transmissions and the number of radio resource blocks. In this operation example, the SI allocation table shown in FIG. 5 is used.

As shown in FIG. 3, the base station 100 acquires the number of transmissions of SI (including the number of retransmissions) via the external interface 101 (S10). Next, the base station 100 refers to the SI allocation table shown in FIG. 5 to acquire the payload size of SI, the number of transmissions, and the number of radio resource blocks associated with the payload size and the number of transmissions (S20).

The base station 100 maps the SI to the predetermined regions of the PDSCH, specifically, the SI-windows on the basis of the payload size, the number of transmissions, and the radio resource blocks which are determined by referring to the SI allocation table (S30), and transmits the SI-windows to which the SI is mapped to the mobile station 200A via the PDSCH (S40).

As described above, in this operation example, the number of transmissions is assumed to be acquired (specified) via the external interface 101. Since the minimum unit of the radio resource block allocation varies depending on a DCI format of the PDCCH and the size of a RB group corresponding to the system bandwidth, the smallest multiples of the unit of allocation which is equal to or larger than a referred value of the SI allocation table is preferably set as the number of RB to be actually allocated. Moreover, when the referred value of the SI allocation table exceeds the number of radio resource blocks included in the system band, the referred value needs to be replaced by the number of radio resource blocks included in the system bandwidth.

(3.1.2) Operation Example 2

FIG. 4 shows an operation flow (part 2) in which the base station 100 determines the number of SI transmissions and the number of radio resource blocks. In this operation example, the SI allocation table shown in FIG. 6 is used. Points different from the operation example 1 described above are mainly described below.

The base station 100 refers to the SI allocation table shown in FIG. 6 to acquire the number of transmissions of SI corresponding to the payload size of SI and the number of radio resource blocks associated with the number of transmissions (S20A). Note that, since the payload size of SI is calculated in the system information generation unit 103 as described above, there is no need to acquire the payload size via the external interface 101.

As described above, in this operation example, the number of transmissions and the number of radio resource blocks to be allocated for each transmission subframe are determined from the payload size of SI. Points such as the point that the minimum unit of the RB allocation varies depending on the DCI format of the PDCCH and on the size of the RB group corresponding to the system bandwidth are the same as those of the operation example 1.

Moreover, regarding the unit of the radio resource block allocation, a RB group unit or a RB unit is restricted depending on the Resource allocation type. Furthermore, in the DCI format, there is a limit in the selectable Resource allocation type. When the system band is 5, 10, 15, and 20 MHz, the RB group is 2, 3, 4, and 4, respectively.

(3.2) Determination of Transmission Subframes for System Information

Next, description is given of an operation of determining the transmission subframes for SI, by referring to FIGS. 7 to 10.

(3.2.1) Operation Example 1

Figure 7:
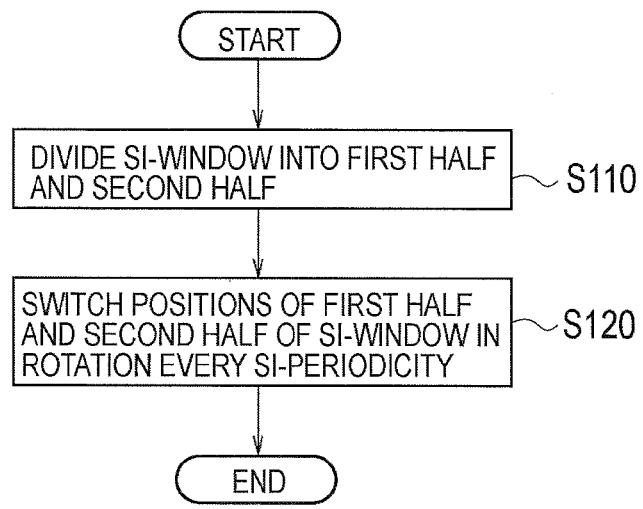
FIG. 7 shows an operation flow (part 1) in which the base station 100 determines the transmission subframes for SI in the embodiment of the present invention.

FIG. 7 shows an operation flow (part 1) in which the base station 100 determines the transmission subframes for SI. As shown in FIG. 7, the base station 100 divides each of the SI-windows into the first half and the second half (S110). Next, the base station 100 switches the positions of the first half and the second half of the divided SI-window every SI-periodicity (see FIG. 11).

Figure 10:
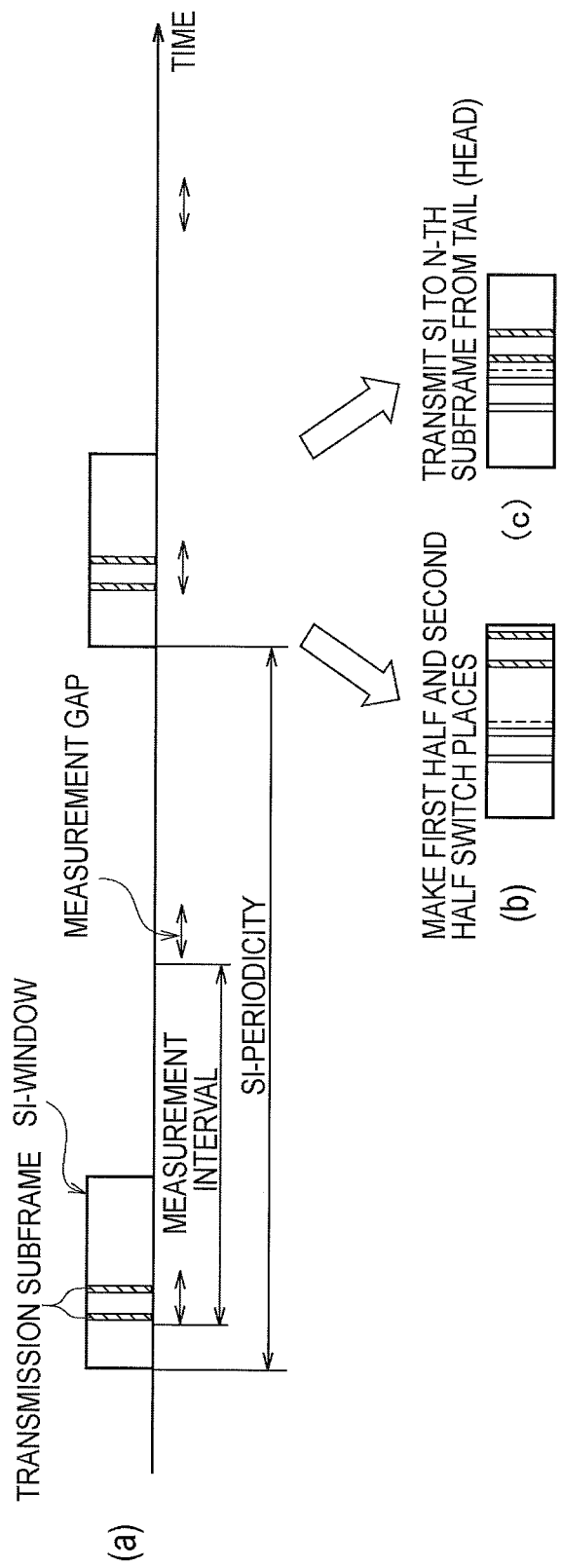
FIG. 10 is a view showing a configuration example of a SI-window including the transmission subframes in the embodiment of the present invention.

FIGS. 10(*a*) to (*c*) show a configuration example of the SI-window including the transmission subframes for SI. As shown in FIG. 10(*b*), in this operation example, the positions of the first half and the second half of the divided SI-window are switched in rotation on the time axis.

Specifically, if the transmission subframes are fixed in the SI-window, the mobile station operating with active Measurement GAP has a possibility of failing to receive the SI since the transmission subframes for SI always overlap the Measurement GAP on the time axis. Specifically, this problem occurs when the SI-periodicity is equal to integer multiples of a frequency of the Measurement GAP.

To solve this problem, in this operation example, the transmission subframes are changed every SI-periodicity. Note that, when any of the transmission subframes collides with the transmission prohibited subframe such as the Measurement GAP as a result of changing the transmission subframe, the number #Subframe_N of the transmission subframe can be incremented until the transmission subframe does not overlap the transmission prohibited subframe any more.

(3.2.2) Operation Example 2

Figure 8:
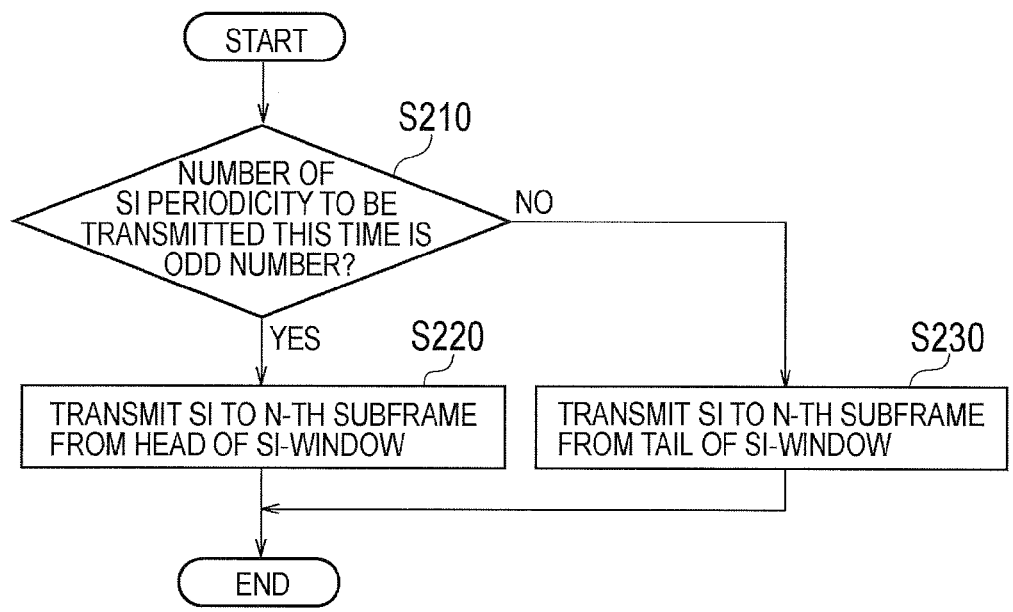
FIG. 8 is a view showing an operation flow (part 2) in which the base station 100 determines the transmission subframes for SI in the embodiment of the present invention.

FIG. 8 shows an operation flow (part 2) in which the base station 100 determines the transmission subframes for SI. As shown in FIG. 8, the base station 100 determines whether the number of the SI periodicity to be transmitted this time is an odd number (S210).

When the number of SI-periodicity is an odd number, the base station 100 transmits the SI to an N-th subframe from the head of the SI-window (S220). Meanwhile, when the number of the SI-periodicity is an even number, the base station 100 transmits the SI to an N-th subframe from the tail of the SI-window (S230).

As shown in FIG. 10(c), in this operation example, the SI is transmitted to the N-th subframe from the tail (or the head) of the SI-window.

Note that, also in this operation example, when the transmission subframe collides with the transmission prohibited subframe, the number #Subframe_N of the transmission subframe may be incremented until the transmission subframe does not overlap the transmission prohibited subframe any more, as in the operation example 1.

Figure 9:
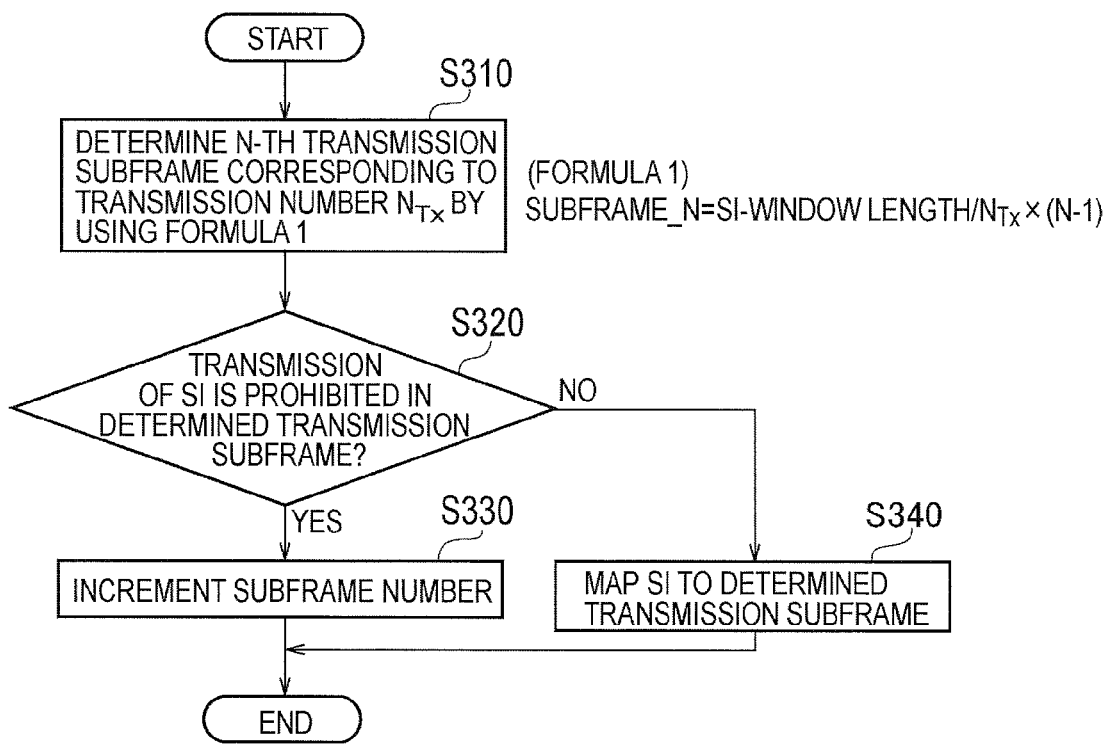
FIG. 9 is a view showing an operation flow (part 3) in which the base station 100 determines the transmission subframes for SI in the embodiment of the present invention.

Moreover, FIG. 9 shows an operation flow (part 3) in which the base station 100 determines the transmission subframes for SI. As shown in FIG. 9, the N-th transmission subframe corresponding to the transmission number $N_{Tx}$ is determined by using (formula 1) described above (S310).

However, since the transmission of SI is prohibited in the transmission subframe of SIB1 and the MBSFN subframe, these subframes need to be handled as the transmission prohibited subframes. Hence, when the determined transmission subframe #Subframe_N matches the transmission prohibited subframe, the base station 100 increments #Subframe_N (#Subframe_N #Subframe_N+1) until the transmission subframe differs from the transmission prohibited subframe (S330 to S340).

Note that, since Paging and RA response in a Random Access procedure have higher priorities than the transmission of SI, the subframes in which these signals are likely to be transmitted may be included in the transmission prohibited subframe in advance.

Moreover, when the specified radio resource block cannot be secured for the transmission of SI in the transmission subframe for SI, the PDSCH scheduler 109 may perform scheduling to carry over the transmission of SI to the next subframe and to perform the assignment of radio resource block again.

(4) Advantageous Effects

In the base station 100, the radio resource blocks required for the transmission of SI are determined based on the SI allocation tables held in the table holding unit 107 and the SI is mapped to the SI-windows of PDSCH by using the determined radio resource blocks. Furthermore, each of the SI allocation tables is associated with the estimated reception quality of the mobile station 200A at the cell edge of the cell C1 formed by the base station 100.

Accordingly, the system information (SI) can be transmitted to the mobile station 200A so that a predetermined reception quality can be secured at the cell edge.

Furthermore, in the embodiment, when the number of radio resource blocks determined based on the SI allocation tables exceeds the number of radio resource blocks included in the system bandwidth, the number of radio resource blocks included in the system bandwidth can be used. Accordingly, it is possible to avoid a case where the radio resource blocks are excessively used.

Moreover, in the base station 100, each of the SI-windows is divided into the first half and the second half in the time direction and the positions of the first half and the second half are switched in rotation every transmission timing of the SI-windows on the PDSCH. Accordingly, even when the mobile station 200A is set to have Measurement GAP for measuring a reception state of an adjacent cell, the mobile station can more surely receive the system information (SI).

Furthermore, in the embodiment, every transmission timing of SI-windows, it is possible to alternately set the mode in which the SI is mapped to the predetermined-numbered transmission subframe from the head of the SI-window in the time direction and the mode in which the SI is mapped to the predetermined-numbered transmission subframe from the tail of the SI-window. Moreover, it is also possible to sequentially change the position of the transmission subframe until the transmission subframe does not overlap the transmission prohibited subframe (Measurement GAP or the like) any more. Accordingly, the mobile station can more surely receive the SI.

(5) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, in the aforementioned embodiment of the present invention, description is given of the operation in which the base station 100 determines the number of transmissions of system information (SI) and the number of radio resource blocks and the operation in which the base station 100 determines the transmission subframes for the system information (SI). However, the base station 100 does not have to perform both the operations. For example, the base station 100 may execute only the operation in which the base station 100 determines the number of transmissions of system information (SI) and the number of radio resource blocks.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2011-197603 (filed on Sep. 9, 2011) is incorporated by reference in the present specification.

INDUSTRIAL APPLICABILITY

According to the characteristics of the present invention, it is possible to provide a base station and a communication control method in which a mobile station can more surely receive the system information (System Information) even when the mobile station is set to have Measurement Gap for measuring the reception state of the adjacent cell.

EXPLANATION OF THE REFERENCE NUMERALS 50 core network
100 base station
101 external interface

103 system information generation unit
105 system information transmission control unit
107 table holding unit
109 PDSCH scheduler
111 transmission data generation unit
113 control information generation unit
115 signal multiplexing unit
117 signal transmission unit
200A, 200B mobile station
C1 cell

The invention claimed is:

1. A base station configured to map system information formed of a plurality of blocks to predetermined regions of a downlink shared channel and transmit the mapped system information to a mobile station, comprising:
   a system information transmission control unit configured to divide each of the predetermined regions into a first half and a second half in a time direction; and
   a transmission data generation unit configured to map the system information to at least one of the first half and the second half, wherein
   the system information transmission control unit switches positions of the first half and the second half in rotation every transmission timing of the predetermined regions on the shared channel, wherein
   when one of the predetermined regions overlaps a predetermined transmission prohibited subframe, the system information transmission control unit sequentially changes a position of the transmission subframe until the one predetermined region does not overlap the transmission prohibited subframe any more.

2. The base station according to claim 1, wherein every transmission timing of the predetermined regions, the system information transmission control unit alternately sets a mode in which the system information is mapped to a predetermined-numbered transmission subframe from a head of the predetermined region in the time direction and a mode in which the system information is mapped to a predetermined-numbered transmission subframe from a tail of the predetermined region in the time direction.

3. The base station according to claim 1, wherein the system information transmission control unit determines the position of a transmission subframe Subframe_N to which the system information is to be mapped, by using a formula $$\text{Subframe\_}N = \text{SI-window length}/N_{Tx} \times (N-1),$$

where $N_{Tx}$ represents the number of transmissions of the system information and SI-window length represents a length of the predetermined region.

4. A communication control method of mapping system information formed of a plurality of blocks to predetermined regions of a downlink shared channel and transmitting the mapped system information to a mobile station, comprising the steps of:
   dividing each of the predetermined regions into a first half and a second half in a time direction;
   mapping the system information to at least one of the first half and the second half;
   switching positions of the first half and the second half in rotation every transmission timing of the predetermined regions on the shared channel; and
   when one of the predetermined regions overlaps a predetermined transmission prohibited subframe, sequentially changing a position of the transmission subframe until the one predetermined region does not overlap the transmission prohibited subframe any more.

* * * * *